Patented Nov. 1, 1932

1,886,237

UNITED STATES PATENT OFFICE

DONALD G. ROGERS, OF HAMBURG, AND JAMES OGILVIE AND JOYCE H. CROWELL, OF BUFFALO, NEW YORK, ASSIGNORS TO NATIONAL ANILINE & CHEMICAL COMPANY, INC., OF NEW YORK, N. Y., A CORPORATION OF NEW YORK

PRODUCTION OF BENZOYL-O-BENZOIC ACID DERIVATIVES AND ANTHRAQUINONE BODIES THEREFROM

No Drawing.  Application filed June 22, 1928.  Serial No. 287,640.

This invention relates to improvements in the production of benzoyl-o-benzoic acid and its derivatives, and to their conversion into anthraquinone bodies. It is particularly concerned with the production of 5'-chlor-2'-hydroxybenzoyl-o-benzoic acid and in the conversion of this compound into 1.4-hydroxyanthraquinone (quinizarine).

According to the present invention, phthalic anhydride is condensed with a benzene substance, for example, a benzene hydrocarbon or a chlor-or chlorhydroxy derivative thereof, particularly 4-chlorphenol, in the presence of anhydrous aluminum chloride (the Friedel-Craft reaction), and in the absence of an organic solvent. The condensation is carried out at a higher temperature, with stirring and with the employment of larger proportions of phthalic anhydride and of aluminum chloride with regard to the benzene substances than has been heretofore proposed.

In general, a composite product is produced comprised of a benzoyl-o-benzoic acid body and of an anthraquinone body, and this composite product is subjected to a further condensation reaction whereby the benzoyl-o-benzoic acid body is converted into an anthraquinone body which may be isolated, if desired; or the treatment may be such that the chlorine atoms which may be present in the alpha-position of the anthraquinone body or bodies are replaced by hydrolysis by hydroxyl groups; all as more fully hereinafter set forth and as claimed.

The invention will be further illustrated by the following specific example, but it will be understood that the invention is not limited thereto. The parts are by weight.

Example

Part I.—Production of 5'-chlor-2'-hydroxybenzoyl-o-benzoic acid: 100 parts (1.17 mols) phthalic anhydride and 300 parts (1.93 mols) anhydrous, granular or powdered aluminum chloride ($Al_2Cl_6$) are charged into a vessel, which is provided with heating and cooling means and equipped with a strong agitator having blades which scrape the sides of the vessel, and the mixture is stirred without addition of external heat until it is intimately mixed. The mixture is then heated to a temperature of about 125°–130° C., at which temperature the mixture is in a semi-molten or partially melted state, and with or without further addition of external heat but with good agitation, 75 parts (1 mol) of 4-chlorphenol, which is in a molten state and at a temperature of about 50°–60° C., is slowly added, for example over a period of 20 to 30 minutes. The reaction is exothermic, and the temperature rises to about 145°–160° C., depending upon the rate of adding the chlorphenol, and other factors. After the 4-chlorphenol has been added, the mixture is quickly heated to a temperature of about 175°–180° C. and held at this temperature until the mass assumes a viscous condition which is difficult to stir, and a sample boiled with acidified water gives little or no odor of chlorphenol. Agitation of the mass is then stopped and it is allowed to cool until the melt has solidified, during which time the agitator may be given one or two turns at intervals, chiefly as an aid to cooling and the prevention of the formation of crusts. It usually requires, depending on the size of the charge, etc., one or more hours to solidify. When solidified, the agitator is again started and the mass ground to a powder. The powder is then added to a vigorously stirred mixture of 500 parts water, 1000 parts of ice, and 66 parts of 66° Bé. sulfuric acid. It is then heated to 90°–95° C. for an hour or more, cold water is added until the temperature drops to 55°–60° C., and the precipitate filtered off and washed first with hot water and then with cold water until substantially free from surfuric acid. The precipitate, which comprises 5'-chlor-2'-hydroxybenzoyl-o-benzoic acid associated with 4-chlor-1-hydroxyanthraquinone, may be dried in any suitable manner. The combined yield, based on the amount of p-chlorphenol taken, is about 90–98 per cent of theory. This yield is approximately 40 to 60 per cent greater than the yield obtained by heretofore proposed similar processes.

In carrying out the above process, crude initial material may be employed although the use of purified or pure material is preferred. Since water reacts with anhydrous aluminum chloride, its presence in the initial material is avoided or minimized, otherwise decreased yields are obtained of the desired final product. The introduction of the molten 4-chlorphenol into the well-stirred and intimate mixture of phthalic anhydride and aluminum chloride at an elevated temperature, instead of adding the aluminum chloride to a hot mixture of phthalic anhydride and 4-chlorphenol as heretofore proposed, gives the best results, the yields being higher, and the process easier to operate since the temperature can be raised more rapidly and the mass does not tend to solidify as early.

Further, the larger proportions of phthalic anhydride and aluminum chloride which are employed tend to keep the mass fluid and enable the employment of comparatively high operating temperatures over a sufficient period of time to allow the reaction to go to substantial completion. The excess proportions of phthalic anhydride and aluminum chloride over that of the 4-chlorphenol employed may be varied considerably, for example, 1.1 to 2.0 mols phthalic anhydride and 1.5 to 2.5 mols of aluminum chloride to one mol of 4-chlorphenol may be used. Although the reaction can be carried out at temperatures of about 110°–200° C., particularly at an initial temperature of about 110°–160° C. and a final temperature of about 160°–200° C., the preferred temperatures are those cited in the example. The use of temperatures lower than about 110° C. and higher than about 200° C. tends to give lower yields and a poorer quality of final product. During the process, while heating to the final temperatures, the mass becomes viscous and finally reaches a point where it practically cannot be further stirred. By the time this point is reached, the condensation reaction, if properly carried out, is substantially complete and most, if not all, of the hydrogen chloride has been evolved. Agitation of the reaction-mass to this point is essential for best results. The apparatus in which the condensation is carried out may be equipped with a reflux condenser, if desired.

Part II.—Production of Quinizarine: In a vessel provided with heating and cooling means and equipped with an agitator, 400 parts of 26 per cent oleum and 40 parts of crystallized boric acid are mixed with stirring, and to this mixture maintained at a temperature of 90°–110° C., there is added 100 parts of the composite mixture comprising 5'-chlor-2'-hydroxybenzoyl-o-benzoic acid and 4-chlor-1-hydroxyanthraquinone (obtainable as described hereinbefore), and the mixture is held at this temperature with agitation for about an hour. The mixture is then heated to 175°–180° C., and maintained at this temperature for about 6 hours, or until the ring closure and hydrolysis is complete. When the reaction is completed, the reaction-mass is added to about 4000–5000 parts warm water and then heated to 90°–95° C. for about an hour. The precipitate, which is comprised chiefly of quinizarine, is filtered off, washed with water until substantially free of sulfuric acid, and dried.

In carrying out out the ring closure and hydrolysis, the ring closure is mostly effected at the lower temperatures, i. e., 90°–110° C., while the replacement of the chlorine atom by the hydroxyl group is mostly effected at the higher temperatures, i. e., 175°–180° C. The temperatures employed may vary considerably, for example, from 80° to 150° C. for effecting ring closure and from 125° C. to 200° C. for effecting hydrolysis. In general, temperatures higher than 200° C. should be avoided otherwise considerable decomposition ordinarily takes place. Boric acid need not be present in effecting ring closure but should be present in effecting hydrolysis; therefore it may be added just prior to effecting hydrolysis, and in case no chlorine atoms are to be replaced by hydroxyl groups it may be omitted altogether. Sulfuric acid monohydrate, and particularly oleum of various strengths may be employed, e. g., 1 to 26 per cent, or higher. Considerably less sulfuric acid and boric acid is employed than heretofore proposed in similar processes.

In general, other benzene substances, e. g., chlorbenzene, cresol, 3-methyl-4-chlorphenol, 3.4-dichlorphenol, may be condensed with phthalic anhydride in a similar manner in the presence of anhydrous aluminum chloride, and the resulting composite product, isolated from aluminum salts, converted into the corresponding anthraquinone body. The conditions of operation, such as temperature, time, etc., will vary more or less for each individual substance but, in general, will be similar to those described above.

We claim:

1. In the production of quinizarine, the improvement which comprises condensing 4-chlorphenol with phthalic anhydride in the presence of anhydrous aluminum chloride to produce a composite product comprised of 5'-chlor-2'-hydroxybenzoyl-o-benzoic acid and 4-chlor-1-hydroxyanthraquinone, and subjecting said composite product to ring closure and hydrolysis to produce quinizarine.

2. In the production of quinizarine, the improvement which comprises condensing 4-chlorphenol with phthalic anhydride in the presence of anhydrous aluminum chloride at an initial temperature of about 110°–160° C. and at a final temperature of about 160°–200° C. to produce a composite product comprising 5'-chlor-2'-hydroxybenzoyl-o-benzoic acid and 4-chlor-1-hydroxyanthraquinone, isolating the said composite product, and subjecting the said composite product to the action of oleum in the presence of boric acid to product quinizarine.

3. In the production of 5'-chlor-2'-hydroxybenzoyl-o-benzoic acid, the improvement which comprises condensing 4-chlorphenol with phthalic anhydride in the presence of anhydrous aluminum chloride at a temperature of 160° C. to about 200° C.

4. In the production of 5'-chlor-2'-hydroxybenzoyl-o-benzoic acid, the improvement which comprises adding 4-chlorphenol in the molten state to a hot mixture of phthalic anhydride and aluminum chloride which is in a semi-molten state.

5. In the production of 5'-chlor-2'-hydroxybenzoyl-o-benzoic acid, the improvement which comprises adding one mol of 4-chlorphenol at a temperature of about 50°–60° C. to a mixture comprising 1.1 to 2.0 mols phthalic anhydride and 1.5 to 2.5 mols aluminum chloride at a temperature of about 125°–130° C., and subsequently heating the reaction mixture to about 175°–180° C.

6. In the production of 5'-chlor-2'-hydroxybenzoyl-o-benzoic acid wherein 4-chlorphenol is condensed with phthalic anhydride in the presence of aluminum chloride, the improvement which comprises adding the fused mass resulting from the condensation to cold dilute sulfuric acid, heating the mixture, and subsequently removing the precipitate thus obtained.

7. The process of producing a chlorbenzoyl-o-benzoic acid body, which comprises reacting one mol of a chlorbenzene substance with an excess of phthalic anhydride and of aluminum chloride at a temperature of 160° C. to about 200° C.

8. In the production of anthraquinone bodies, the improvement which comprises reacting a benzene substance with an excess of phthalic anhydride in the presence of an excess of aluminum chloride in the absence of an organic solvent to produce a benzoyl-o-benzoic acid body in admixture with an anthraquinone body, recovering said admixture substantially free from aluminum salts, and treating said recovered admixture with sulfuric acid to convert said benzoyl-o-benzoic acid body to an anthraquinone body.

9. In the production of 4-chlor-1-hydroxyanthraquinone, the improvement which comprises treating a composite mixture comprising 5'-chlor-2'-hydroxybenzoyl-o-benzoic acid and 4-chlor-1-hydroxyanthraquinone with sulfuric acid whereby the 5'-chlor-2'-hydroxybenzoyl-o-benzoic acid is converted to 4-chlor-1-hydroxyanthraquinone.

10. In the production of a chlorhydroxybenzoyl-o-benzoic acid, the improvement which comprises incorporating a chlorphenol in liquid state with a well-stirred mixture comprising an excess of phthalic anhydride and of anhydrous aluminum chloride, and subsequently heating the reaction-mixture at a temperature of about 160°–200° C.

11. In the production of an anthraquinone body, the improvement which comprises reacting a chlorphenol with excess phthalic anhydride in the presence of an excess of anhydrous aluminum chloride to produce a composite product comprising a chlorhydroxybenzoyl-o-benzoic acid body and an anthraquinone body, treating said composite product with an acid to form a composite product comprising an admixture of a chlorhydroxybenzoyl-o-benzoic acid and of an anthraquinone, isolating said composite product, and subsequently treating said composite product with a concentrated sulfuric acid to convert said chlorhydroxybenzoyl-o-benzoic acid to an anthraquinone body.

12. In the production of a chlorhydroxybenzoyl-o-benzoic acid, the improvement which comprises incorporating a chlorphenol in the molten state with a well-stirred mixture comprising anhydrous aluminum chloride and a phthalic anhydride in the molten state, and rapidly heating the reaction mixture to a temperature of about 160° to about 180° C.

13. In the production of anthraquinone bodies, the improvement which comprises condensing a chlorphenol with phthalic anhydride in the presence of anhydrous aluminum chloride at a temperature of 160° C. to about 200° C. to produce a chlorhydroxybenzoyl-o-benzoic acid compound.

14. In the production of anthraquinone bodies, the improvement which comprises heating a mixture containing a chlorhydroxybenzoyl-o-benzoic acid and a chlorhydroxyanthraquinone with fuming sulfuric acid in the presence of boric acid at a temperature of 160° to 180° C. to produce a product containing a hydroxyanthraquinone.

15. In the production of a chlorhydroxybenzoyl-o-benzoic acid, the improvement which comprises adding a chlorphenol in the molten condition to a mixture of phthalic anhydride and aluminum chloride, at a temperature of 110° to 160° C., and then heating the resulting reaction mixture at 160° to about 200° C.

16. In the production of a chlorhydroxybenzoyl-o-benzoic acid, the improvement which comprises adding a chlorhydroxy derivative of benzene in the molten condition to a mixture of phthalic anhydride and aluminum chloride, both in excess, which mixture is at a temperature of about 110° to about 160° C., and then heating the resulting mixture while in a liquid condition at 160° to about 200° C.

17. In the production of a chlorhydroxybenzoyl-o-benzoic acid, the improvement which comprises mixing a chlorhydroxy derivative of benzene with an excess of phthalic anhydride and of aluminum chloride, and heating the resulting mixture while in a fluid condition at a temperature of 160° to about 200° C.

18. In the production of a chlorhydroxybenzoyl-o-benzoic acid, the improvement which comprises mixing a chlorphenol with an excess of phthalic anhydride and of aluminum chloride, and heating the resulting mixture while in a fluid condition at a temperature of about 175° to about 180° C.

19. In the production of a quinizarine, the improvement which comprises heating a 4-chlorphenol with phthalic anhydride and anhydrous aluminum chloride to produce a composite product comprising a 5'-chlor-2'-hydroxybenzoyl-o-benzoic acid and a 4-chlor-1-hydroxyanthraquinone and subjecting said composite product to ring closure and hydrolysis to produce a quinizarine.

20. In the production of a quinizarine, the improvement which comprises heating a 4-chlorphenol with phthalic anhydride and anhydrous aluminum chloride at a temperature of 160° to about 200° C. to produce a composite product comprising a 5'-chlor-2'-hydroxybenzoyl-o-benzoic acid and a 4-chlor-1-hydroxyanthraquinone, isolating said composite product, and heating said composite product with oleum and boric acid at a final temperature of 125° to 200° C. to produce a quinizarine.

21. In the production of anthraquinone bodies, the improvement which comprises heating a mixture containing a 5'-chlor-2'-hydroxybenzoyl-o-benzoic acid and a 4-chlor-1-hydroxyanthraquinone with fuming sulfuric acid and boric acid at a final temperature of 150° to 180° C. to produce a product containing a quinizarine.

In testimony whereof we affix our signatures.

DONALD G. ROGERS.
JAMES OGILVIE.
JOYCE H. CROWELL.